July 23, 1940.  A. I. APPLETON  2,208,558
MULTIPLE-CHAMBERED EXPLOSIONPROOF BOX AND FITTING
Filed Nov. 19, 1938   2 Sheets-Sheet 2
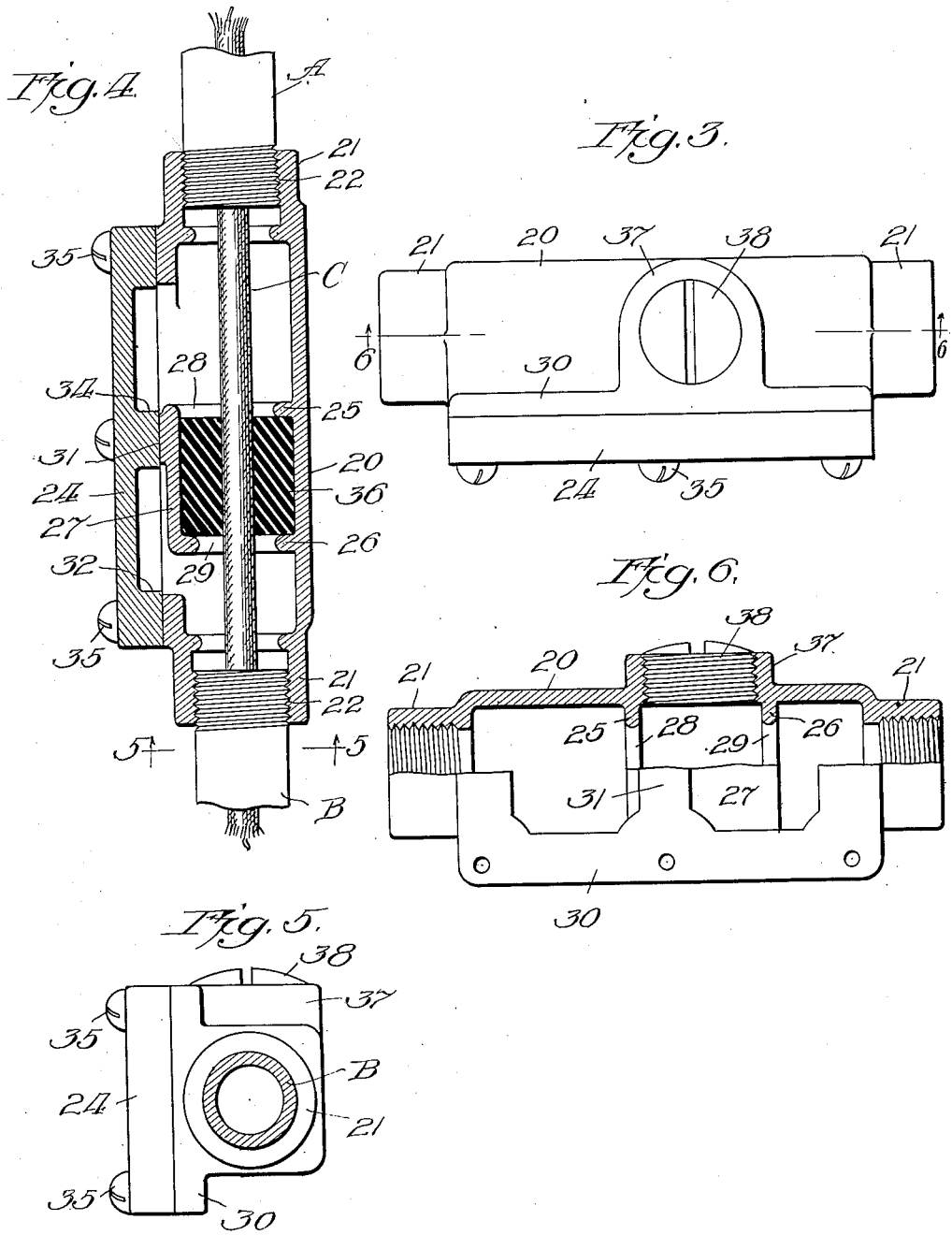

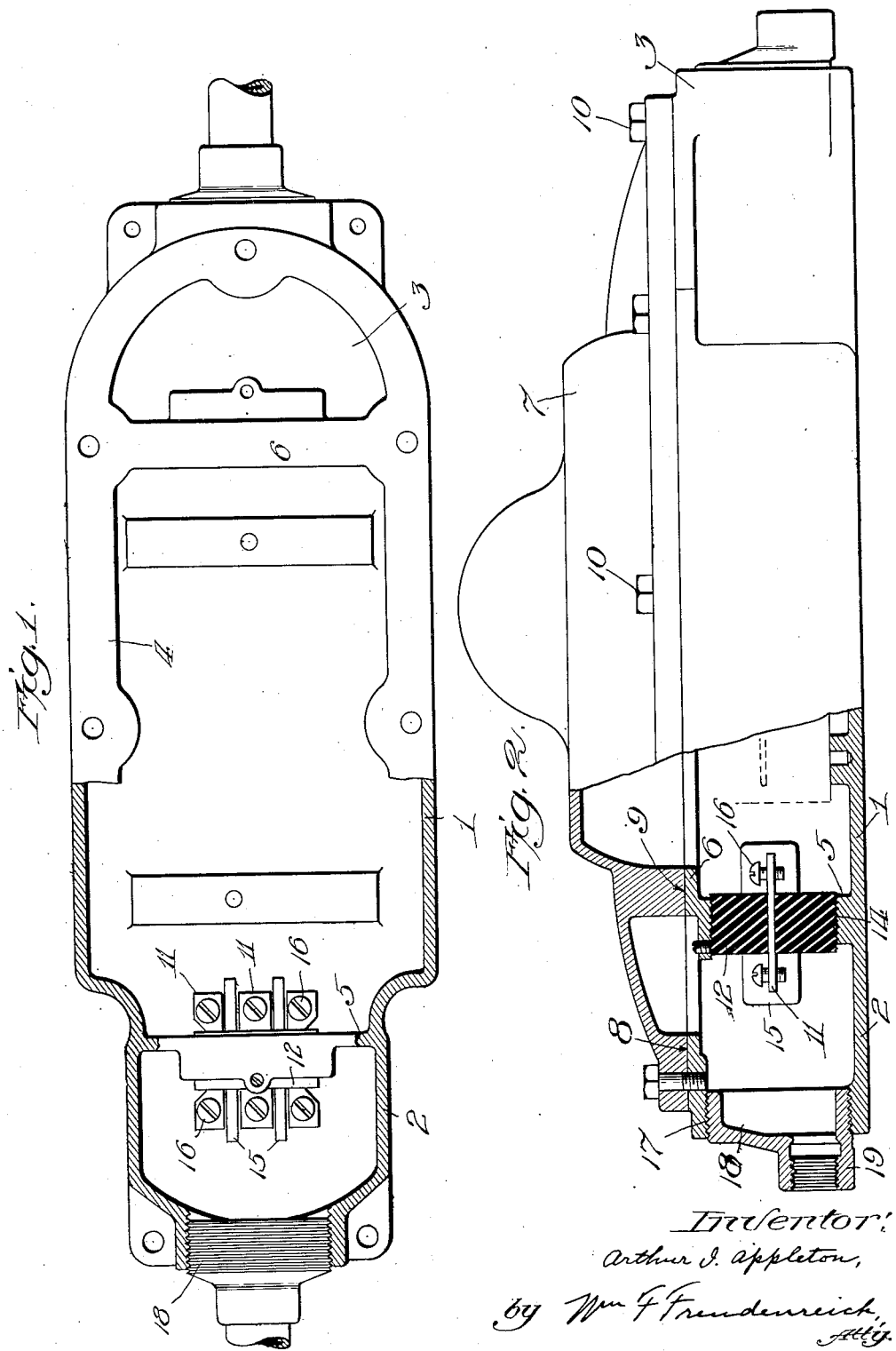

Patented July 23, 1940

2,208,558

UNITED STATES PATENT OFFICE 2,208,558

MULTIPLE-CHAMBERED EXPLOSIONPROOF BOX AND FITTING

Arthur I. Appleton, Chicago, Ill., assignor to Appleton Electric Company, a corporation of Illinois Application November 19, 1938, Serial No. 241,337

4 Claims. (Cl. 174—50)

It is common to provide switch boxes, for example, with chambered extensions in which connections may be made by lead in wires with conductors extending through and sealed in the walls separating the chambers from the interiors of the boxes. In order to afford access to the chambers in these extensions, it is customary to provide them with detachable covers. The covers must of course make tight joints with the members to which they are applied; the preferred type of joint being formed by having flat surfaces engaged with each other. The fire underwriters laboratories require that the meeting faces in such a joint have a predetermined, considerable width in order to insure the extinguishing of a flame seeking to pass between the engaging surfaces. Consequently, when a switch box is provided with its own usual cover and with covers for one or more separate extensions, a considerable area of machined surface on both the box and the covers is required.

The object of the present invention is so to construct a switch box or the like, or a sealing fitting for conduits, provided with a plurality of chambers that must be sealed one from the other and each be capable of being opened to give access to the interior thereof, that a single cover will serve as closures of the chambers in a manner to reduce the machined area of the surfaces in the joints with the cover considerably below that required in the case of a separate cover for each chamber.

By employing only a single cover for a plurality of chambers in these boxes or fittings, all of the chambers must be opened to give access to one of them. Also, a lesser number of screws or other fastening devices is required for a single cover than for a plurality of covers serving the same purpose. Therefore, viewed in one of its aspects, the present invention may be said to have for its object to simplify the opening of a plurality of chambers in a switch box or other fitting for use in electricity distribution systems and insure that when one chamber is open, the others will also be open.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a top plan view, with a part shown in section, of a switch box embodying the present invention, with the cover removed; Fig. 2 is a view partly in side elevation and partly in section, of the box with the cover applied thereto; Fig. 3 is a side elevation of a conduit sealing coupling embodying the present invention; Fig. 4 shows the fitting of Fig. 3 in longitudinal section and serving to connect two vertical conduits; Fig. 5 is a section on line 5—5 of Fig. 4; and Fig. 6 is a plan view, looking at the open side of the fitting, with the cover removed, one-half of the device being shown as a section on line 6—6 of Fig. 3.

Referring to Figs. 1 and 2, I represents a box, which may be a switch box, having extensions 2 and 3 at opposite ends. The entire box, with its extensions, is open at the top and is there provided with a continuous border flange 4 of considerable width. The chambers in the extensions 2 and 3 are separated from the main chamber in the body of the box by transverse walls 5, which terminate at the top in wide, flat surfaces 6 merging at their ends in the rim flange 4.

The box cover 7 is of a size and shape to extend over the box with its extensions and is provided with machined areas 8 and 9 that overlie and are co-extensive with the rim flanges 4 and the transverse surfaces 6. The cover may be fastened to the box and its extensions by means of a few screws 10.

It will be seen that when the cover is in place, the surfaces 6 on the cross walls or partitions serve not only to prevent the escape of flame across them from the interior of the body of the box, but also in the opposite direction, from the extensions toward the interior of the box. Were the box and each of its extensions provided with separate covers, the sealing faces or surfaces 6, 6 would have to be duplicated, thus not only increasing the area that needs machining, but increasing the overall length of the box by twice the width of one of these faces if the same length of opening in the box proper and its extensions were desired.

Electrical conductors 11 extend through the walls 5; each conductor or group of conductors being surrounded with a block of sealing material 12 that prevents the flow of fluids or flame through the openings in the transverse walls or partitions. In the arrangement shown, the conductors 11 are short bars molded in a thick block 12 of insulating material and projecting beyond opposite sides of the latter. The block is indicated as being cylindrical and as being held in position by screw threads 14 between the same and the surrounding wall. Where there are a plurality of conductors, a guard plate 15 may project from the block of insulating material between adjacent bar ends. Each of the bars or conductors 11 is provided at its ends with screws 16 by means of which electrically conductive connections may be made with wires.

While the sealing blocks 12 are shown as being preformed about the conductor or terminal members 11, it should be understood that the terminal members or conductors may be properly located in the openings in the transverse walls and a plastic sealing compound be introduced into these openings. In any event, when the cover is removed, the interior of the box and of its extensions are all exposed to view, and all of the necessary connections may be made at one time.

I have illustrated also another feature, in the form of an adapter, to permit any desired size of conduit, between a small size and a very large size, to be properly connected to each of the terminal chambers of the extensions 2 and 3. To accomplish this, I provide the extreme end walls of the structure with screw threaded openings 17 somewhat larger than the diameter of the block or plug 12. Into these openings are screwed cup-shaped plugs 18, the bottom wall of each of which has a tubular outward extension 19 lying just within the periphery of the plug. These plugs may be made in sets or series in which the plugs differ from each other only in the size of their tubular extensions. For a small conduit, a plug having a small tubular extension is used. For larger conduits, plugs with correspondingly larger tubular extensions are substituted. It will be seen that the tubular extension may be increased in size until it corresponds in diameter substantially with the diameter of the plug itself, so that the bottom wall of the cup practically vanishes. With this arrangement, a cable or conductor may be brought into the bottom of one of the auxiliary chambers, while its conduit is securely held in the adapter, regardless of the size thereof.

In Figs. 4 to 6, there is illustrated a coupling or connection for making a seal between two conduits through which a conductor or the like extends. This fitting comprises an elongated box 20 of small cross sectional area adapted to be screwed on or otherwise fastened about the ends of two aligned conduits; the end portions 21 of the member 20 being tubular in form. In the arrangement shown, the tubular or sleeve-like ends 21 of the member 20 are internally screw threaded, as indicated at 22, to receive complementary screw threads on the ends of conduits such as indicated at A and B. C represents a cable or conductor extending from one of the conduits through the fitting and into the other conduit. The box is open on one side and is provided with a cover 24 for closing that side. Within the box are two transverse partitions 25 and 26 spaced apart from each other. These partitions are connected together by an imperforate wall 27 that extends between what may be termed the side walls of the box just within the plane of the box face on the open side. The partition 25 has an opening 28 therethrough so large that there is very little of the partition left. The partition 26 has a similar but somewhat smaller opening 29.

The face of the fitting or box on the open side is composed of a flat flange-like rim 30 of considerable width, as in the case of the rim or flange 4 in Figs. 1 and 2, together with a cross surface or area 31 on a slightly raised portion of the wall 27 in the neighborhood of the mutilated cross wall 25. The surface 31, together with the face of the rim or flange 30, lie in the same plane and are properly machined so as to fit intimately against corresponding surfaces on the inside of the cover. In order to facilitate manufacture, the cover is provided on the inner side with a wide, low rib 32 forming a frame that follows along the edges of the cover, together with a cross rib 34 joined at its ends with the frame-like rib and positioned so as to register accurately with the surface 31 of the box when the frame-like rib rests on the rim or flange 30. The faces of the ribs 32 and 34 are of course machined so as to fit accurately against the cooperating faces on the box.

The cover may be fastened in place by means of screws 35 or other suitable fastening means. It will be seen that when the cover is in place, the interior of the box is divided into three chambers which are placed in communication with each other through the large openings 28 and 29 in the cross partitions. Therefore, a conductor may be drawn through the fitting from one conduit to the other.

In order to effect a seal that will prevent communication between the two conduits, after the conductor has been installed, I fill the central chamber, which is the one bounded at its ends by the partitions 25 and 26, with a sealing compound 36. When the conduits are vertical as shown and the conductor or cable has been inserted, the detachment of the cover gives access to all of the chambers within the fitting. The plastic compound may now be poured into the central chamber through the opening 28 in the partition 25. If the compound is sufficiently plastic to cause it to flow out through the opening 29, unless restrained from doing so, it is a simple matter to fill the lower chamber, below the partition 26, temporarily, with loose material which will hold the plastic material against flowing down through the opening 29, and which may easily be removed after the plastic compound has set.

Sometimes these sealing connections are in horizontal positions, as shown in Figs. 3 and 6 when connecting horizontal conduits. In such case, the sealing chamber cannot be readily filled in the manner just described. I have therefore provided another opening for the introduction of the sealing compound, for use when the fitting is in horizontal position. This opening is through a tubular or sleeve-like hub 37 projecting from that portion of a side wall of the box behind which the sealing chamber in the box lies; the bore in the hub extending entirely through this wall of the box so that when the interior of the hub is not obstructed, a sealing compound may be poured through the same and into the sealing chamber when the box stands in such a position that the tubular hub is at the top, as shown in Fig. 6. Normally, there is screwed into the hub a plug 38.

With this arrangement, it is possible to make certain that the sealing chamber is completely filled from one side wall to the other and from the bottom wall of the box to the wall 27. If desired, the two end chambers in the fitting may be provided with a temporary filling or other means to form dams to prevent the sealing compound from oozing out through the holes 28 and 29. This can readily be done and the pouring of the sealing compound be carried out without even fastening the main cover to the box; so that the material that was used to hold back the sealing compound can be removed again before the cover is finally fastened in place.

It will be seen that the partitions 25 and 26, together with the wall 27, form, in effect, a thick, hollow wall which corresponds to one of the walls 5 in the first form.

While I have illustrated and described with particularity only a single preferred form of my invention, with a single modification, I do not desire to be limited to the exact structural details thus illustrated and described; but intend to cover all forms and arrangements which come within the definitions of my invention constituting the appended claims.

I claim:

1. A device for use in systems for the distribution of electricity comprising a box open on one side and containing two chambers separated by a wall extending inwardly from the open side, the box having a rim or edge flange extending continually around the same on the open side and providing a wide, flat machined surface, the edge of said wall at said open side having thereon a similar wide, flat machined surface merging at its ends in opposite sections of the face of said continuous rim or flange, a cover for the open side of the box having thereon flat machined surfaces as wide as and engaged with the aforesaid surfaces, said wall having an opening through the same, a conductor extending through said opening, and sealing means filling said opening around the conductor, the sealing means being localized in said opening so as to leave the interior of said chambers unobstructed.

2. A device for use in systems for the distribution of electricity comprising a box open on one side and containing two chambers separated by a wall extending inwardly from the open side, the box having a rim or edge flange extending continually around the same on the open side and providing a wide, flat machined surface, the edge of said wall at said open side having thereon a similar wide, flat machined surface merging at its ends in opposite sections of the face of said continuous rim or flange, a cover for the open side of the box having thereon flat machined surface as wide as and engaged with the aforesaid surfaces, a wall of the box having an opening connecting said chambers together, a conductor extending through said opening and lying partly in one of said chambers and partly in the other chamber, and sealing means localized in said opening to close the same so as to leave the chambers unobstructed and permit connections to be made with the conductor within both of said chambers upon removal of the cover.

3. A device for use in systems for the distribution of electricity comprising a box open on one side and containing two chambers separated by a wall extending inwardly from the open side, the box having a rim or edge flange extending continually around the same on the open side and providing a wide, flat surface, the edge of said wall at said open side having thereon a similar wide, flat surface merging at its ends in opposite sections of the face of said continuous rim or flange, a cover for the open side of the box having thereon flat surfaces as wide as and engaged with the aforesaid surfaces, said wall having an opening through the same, said wall being hollow and having openings from the interior thereof into each of said chambers, a sealing compound filling the interior of said hollow wall, and a conductor extending through said sealing compound from one of said chambers to the other.

4. A device for use in systems for the distribution of electricity comprising a box open on one side and containing two chambers separated by a wall extending inwardly from the open side, the box having a rim or edge flange extending continually around the same on the open side and providing a wide, flat surface, the edge of said wall at said open side having thereon a similar wide, flat surface merging at its ends in opposite sections of the face of said continuous rim or flange, a cover for the open side of the box having thereon flat surfaces as wide as and engaged with the aforesaid surfaces, said wall having an opening through the same, said wall being hollow and having openings from the interior thereof into each of said chambers, a sealing compound filling the interior of said hollow wall, a conductor extending through said sealing compound from one of said chambers to the other, and means at the ends of the box to connect it to conduits and cause each of said chambers to be placed in open communication with the corresponding conduit.

ARTHUR I. APPLETON.